United States Patent [19]

Payne

[11] 4,024,665
[45] May 24, 1977

[54] DIVER'S FISH SPEAR

[76] Inventor: Philip W. Payne, 1375 Miguelito Road, Lompoc, Calif. 93436

[22] Filed: Mar. 17, 1976

[21] Appl. No.: 667,844

[52] U.S. Cl. .................................... 43/6; 294/127
[51] Int. Cl.² ...................................... A01K 81/00
[58] Field of Search ............ 43/5,6; 294/61, 86.24, 294/126–130, 127; 273/106.5

[56] References Cited

UNITED STATES PATENTS

| 292,378 | 1/1884 | Stahl ................................. 294/127 |
| 1,344,693 | 6/1920 | Hinsdale .................................. 43/6 |
| 2,118,147 | 5/1938 | Blodgett et al. ...................... 43/6 X |
| 2,820,634 | 1/1958 | Vance ...................................... 43/6 |
| 3,050,897 | 8/1962 | Pitts ......................................... 43/6 |

Primary Examiner—Louis G. Mancene
Assistant Examiner—Peter K. Skiff
Attorney, Agent, or Firm—Ralph B. Pastoriza

[57] ABSTRACT

The fish spear includes a shaft with scissor-like blades on one end, the front edges of the blades defining barbs and the back edges being smooth. When the blades are in closed position, a spear shape is defined for spearing a fish. When the blades open past each other, the front edges with the barbs penetrate the flesh of the fish and retain the fish on the spear. A manually operable pull cable connected to the blades will move them to their closed position, thus retracting the barbs and permitting easy removal of the spear from the fish.

2 Claims, 4 Drawing Figures

DIVER'S FISH SPEAR

This invention relates generally to spear constructions and more particularly to a spear used by divers in spearing fish.

BACKGROUND OF THE INVENTION

Fishing spears presently known in the art are of two types. First, a simple shaft is provided with a smoothly contoured, pointed blade on its end which will easily penetrate a fish. This simple spear construction has the advantage of enabling relatively easy spearing of the fish since the sharp pointed blade can easily penetrate the flesh of the fish and further, it is very simple to retract or pull the spear free from the fish when bagging the fish; that is, when the diver deposits the speared fish in a convenient carrying bag.

The very feature of easy removal of this type of spear in bagging the fish, however, represents a disadvantage since the fish can often work free of the end of the spear prior to bagging the fish. As a result, many speared fish are lost.

The second type of spear incorporates barbs in the penetrating or blade portion of the spear. The provision of barbs solves the problem of a fish working loose after once speared. On the other hand, a barbed type of spear with the barbs exposed does not penetrate the flesh of a fish as readily as a smooth blade. Moreover, there is considerable time involved in attempting to retract the spear from the speared fish when bagging the fish. Even if a caging arrangement is provided for the barbs, removal of these types of spears still requires that the diver holds the fish exterior of the bag with one hand while retracting the spear with the other. This procedure can be awkward and in many instances, mortally wounded fish will simply escape prior to being actually placed in the bag and die elsewhere.

BRIEF DESCRIPTION OF THE PRESENT INVENTION

Bearing the foregoing in mind, the present invention contemplates an improved fishing spear particularly useful by divers wherein the advantages of the smooth blade or barbless type spear known in the art and also the advantages of a barbed spear can be realized without the heretofore described disadvantages.

More particularly, in accord with the present invention, there is provided a diver's spear including a shaft with appropriate penetrating means at one end and barb means at the same end for retaining a fish on the shaft after it has been speared by the penetrating means. Further means are provided on the shaft of the spear operable by the diver with the same hand holding the spear for retracting the barb means in a manner to permit easy removal or retraction of the spear from the fish.

With the foregoing construction, after the diver has speared a fish, it will be retained on the end of the spear by the barb means and the diver can immediately bag the fish and operate the barb retracting means with the same hand holding the spear as described above so that the spear is removed with the fish in the bag and there is eliminated the possibility of escape of the fish. Further, the construction is such that the barb means are normally retracted so that the penetrating means can easily pass into the flesh of the fish during the initial spearing operation, the barb means automatically becoming exposed in response to the surrounding pressure of the tissue of the fish on the penetrating means and barb means.

BRIEF DESCRIPTION OF THE DRAWINGS

A better understanding of this invention will be had by now referring to the accompanying drawings in which.

DETAILED DESCRIPTION OF THE INVENTION

Figure 1:
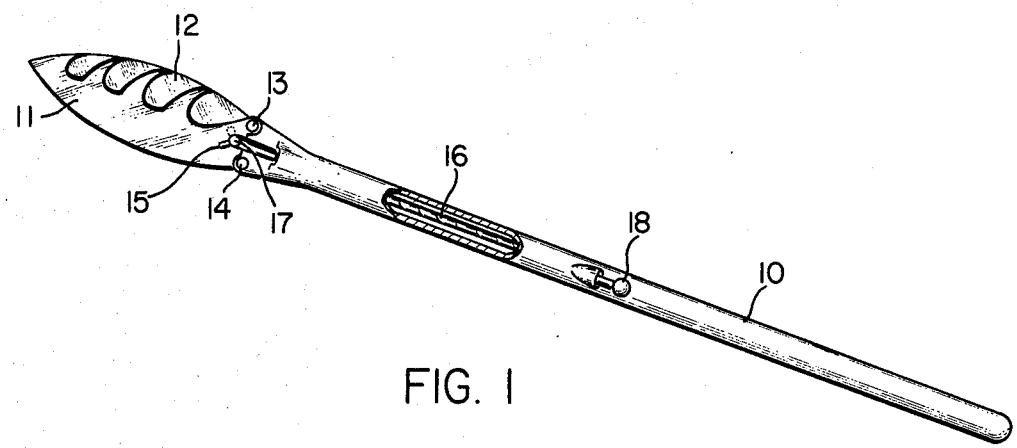
FIG. 1 is a perspective view of the preferred embodiment of the fish spear of this invention.

Referring first to FIG. 1, the spear includes a shaft 10 having penetrating means at one end of the shaft in the form of first and second scissor-like blades 11 and 12. These blades are respectively pivoted to one end of the shaft for rotation about axes passing through spaced ponts 13 and 14 on either side of the longitudinal axis of the spear shaft 10 as shown.

Each of the blades also includes small angulated slots between the pivots 13 and 14 as indicated at 15 for the blade 11. A retracting means including a cable 16 has one end connected to a pin 17 passing through the small slot 15 and the corresponding slot on the other blade 12, this cable passing within an interior hollow portion of the shaft 10 and thence out a side opening to terminate in a small sphere 18.

Figure 2:
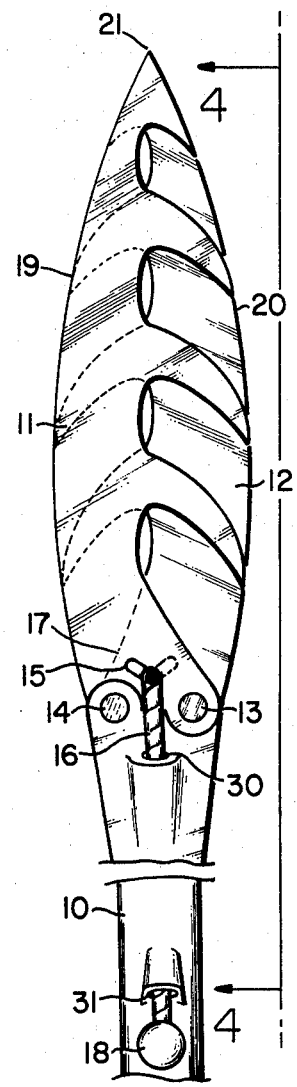
FIG. 2 is a greatly enlarged fragmentary view of the penetrating means and barb means on the end of the spear in a closed position wherein the barbs are retracted.

Referring to FIG. 2, it will be noted that each of the blades 11 and 12 has a smooth convex back edge indicated at 19 and 20 respectively defining a spear outline terminating in an end point 21 when the scissor-like blades are in the closed position illustrated in FIG. 2.

Figure 3:
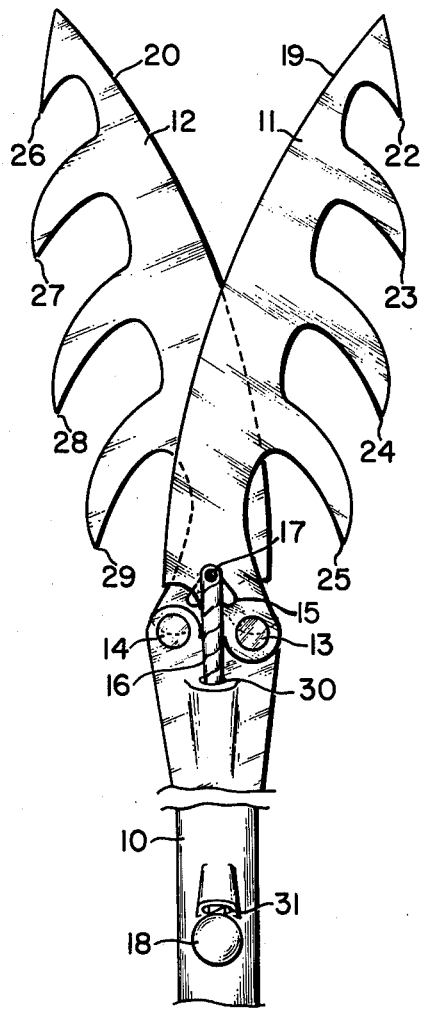
FIG. 3 is a view similar to FIG. 2 illustrating the barbs in extended position for retaining a fish after spearing; and, FIG. 4 is a view taken in the direction of the arrows 4—4 of FIG. 2.

Referring now to FIG. 3, the blades 11 and 12 are shown in an open position wherein they have been pivoted past each other to fully expose their front edges. Each of these front edges defines a series of barbs such as indicated at 22, 23, 24, and 25 for the blade 11 and 26, 27, 28, and 29 for the blade 12. The barbs are directed outwardly and rearwardly and terminate in sharp points.

The configuration of the barbs as clearly illustrated in FIG. 3 is such that when the blades are in their closed position as illustrated in FIG. 2, the barb front edge of each blade terminates short of the back edge of the other to be eclipsed thereby.

In the preferred embodiment shown, it will be understood that the blades 11 and 12 are essentially mirror images of each other and the spear would appear the same as illustrated in FIGS. 2 and 3 if viewed from the opposite side, except that the cable 16 forming part of the retraction means and the small sphere 18 would not be visible.

As illustrated in both FIGS. 2 and 3, the cable 16 passes into the hollow shaft portion through an upper opening 30 below the pin 17 and elongated slots such as the slot 15. The other end of the cable passes through the side opening of the spear 10 as indicated at 31 to terminate in the sphere 18. The positioning of the side opening 31 on the spear shaft 10 is such that the sphere 18 may be urged along the shaft length by a diver's thumb of his hand holding the spear.

Figure 4:
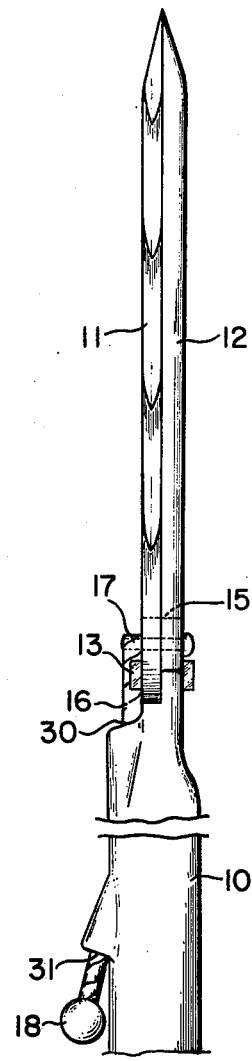

FIG. 4 illustrates more clearly the pin 17 on the end of the cable 16 passing through the elongated opening 15 of the blade 11 and corresponding opening in the other blade 12, these openings and the pin portion passing therethrough being shown in dotted lines. The pin 17 itself terminates in an enlarged head on the exterior of the elongated opening for the blade 12 to hold the pin within the slot.

OPERATION

In operation, a diver underneath the water will hold the spear in a normal manner and can be assured that the blades are in their closed position as illustrated in FIG. 2 by simply exerting a small pressure on the sphere 18 to exert a pulling force on the cable 16. It will be noted in FIG. 2 that such a pulling force will create a moment since the pin on the end of the cable is disposed along a line intermediate the spaced pivot points 13 and 14 for the blades, this moment holding the blades in their closed position. In this position, the pin 17 is at the bottom of the respective slots such as the slot 15 illustrated for the blade 11 and the slot for the blade 12 shown in dotted lines.

When the diver spears a fish, the blades will easily penetrate the flesh of the fish because of the smoothly contoured configuration defined by their back edges and the terminal point 21 as shown in FIG. 2. The barbs of the blades are completely eclipsed when the blades are in their closed positions so that they will not interfere with proper penetration of the spear.

After penetration, there is exerted on the respective back edges of the blades pressure from the tissue of the fish which naturally tends to contract about the opening caused by penetration, this pressure causing an initial slight opening of the blades to expose the tips of the barbs. Pulling movement on the spear shaft or similar movements on the part of the fish in attempting to escape which motions tend to retract the spear result in the barbed points sinking further into the flesh in view of their orientation laterally and rearwardly which action in turn will cause further separation or opening up of the blades to the position illustrated in FIG. 3. It will be understood, of course, that the diver will no longer exert any pressure on the sphere 18 so that the cable 16 is free to move upwardly as viewed in FIG. 3, the pin 17 then assuming a position at the upper ends of the slots.

With the blades in the open position as shown, the barbs will prevent the fish from escaping from the end of the spear and the diver still holding the spear with one hand can easily place the fish while on the end of the spear in his bag. At this point, the diver will then exert a pulling force on the cable by depressing the sphere 18 with his thumb and simultaneously exert an inward movement of the spear both actions of which will immediately retract the barbed blades to their closed positions illustrated in FIG. 2. The blades cannot pass beyond the position illustrated in FIG. 2 in view of their lower edge portions respectively engaging about the body holding the pivots 13 and 14.

With the blades in their closed position, it is very simple to withdraw the spear from the fish while the fish is in the bag. Further, the spear is in proper condition for spearing another fish.

From the foregoing description, it will thus be evident that the present invention has provided a greatly improved spear embodying the advantages of both the prior art mentioned types of spears without the attendant disadvantages thereof.

What is claimed is:

1. A diver's fish spear including, in combination:
   a. a shaft;
   b. first and second scissor blades pivoted to one end of said shaft for rotation about axes passing through spaced points on either side of the longitudinal axis of the shaft, each of said blades having a smooth convex back edge and a barbed front edge including a series of barbs directed outwardly and rearwardly and terminating in sharp points such that when in closed position, the blades overlap with the back edges defining a spear outline terminating in an end point, and the barbed front edge of each blade terminating short of the back edge of the other so that the points are eclipsed thereby, pivoting of the blades past each other towards an open position respectively exposing said barbed front edges so that full opening of the blades after spearing of a fish is facilitated by attempts of the fish to eject the spear; and,
   c. retracting means connected to said blades and extending within said hollow portion of said spear and thence out of a side of the spear for manual operation by the same one hand of a diver holding the spear to retract said blades to their closed position.

2. A spear according to claim 1, in which said retracting means includes a flexible cable coupled to said blades along a line intermediate said spaced points of pivoting so that a pulling of said cable from said side of the spear transmits a moment to the blades simultaneously to pivot them to their closed positions, whereby an inward puhsing of the spear while simultaneously pulling on the cable facilitates pivoting of the blades to their closed position to thereby enable easy removal of the spear from a fish.

* * * * *